R. E. EBBS & J. A. McCULLER.
NUT LOCK.
APPLICATION FILED SEPT. 19, 1910.
1,020,386.
Patented Mar. 12, 1912.
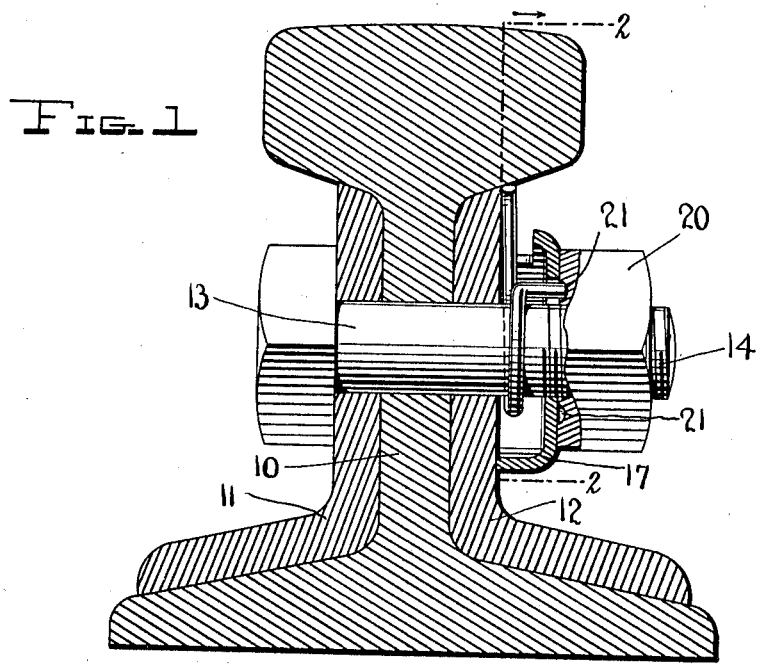
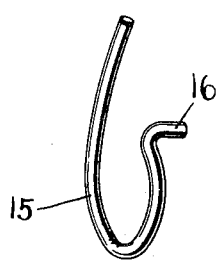
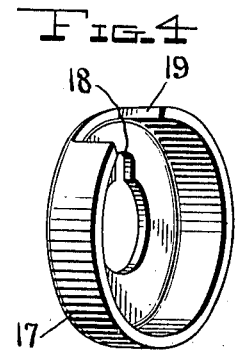
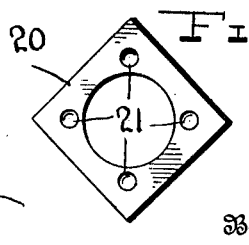
Witnesses
L. B. James
H. A. Farnham
Inventors
Robert E. Ebbs
James A. McCuller
By Henry T. Bright
Attorney

UNITED STATES PATENT OFFICE.

ROBERT ESPY EBBS AND JAMES ALEXANDER McCULLER, OF GURDON, ARKANSAS.

NUT-LOCK.

1,020,386.  Specification of Letters Patent.  Patented Mar. 12, 1912.

Application filed September 19, 1910. Serial No. 582,645.

*To all whom it may concern:*

Be it known that we, ROBERT ESPY EBBS and JAMES ALEXANDER MCCULLER, citizens of the United States, residing at Gurdon, in the county of Clark, State of Arkansas, have invented certain new and useful Improvements in Nut-Locks; and we do hereby declare the following to be a full, clear, and exact description of the invention, such as will enable others skilled in the art to which it appertains to make and use the same.

This invention relates to nut locks and particularly to that type adapted to be associated with a rail joint to effectually secure the rail ends and the fish plates of the joint together.

The object of the invention resides in the provision of a nut lock which will effectually secure a nut against accidental rotation on a bolt as the result of vibration, jarring or other like causes.

A further object of the invention resides in the provision of a nut lock which will be simple in construction, efficient and certain in use and which can be manufactured at an exceedingly small cost.

With the above and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views; and in which, Figure 1 is a transverse section through an ordinary rail joint showing the nut lock associated therewith; certain portions of said nut lock being shown in elevation and other portions in section; Fig. 2, a section on the line 2—2 of Fig. 1; Fig. 3, a detail perspective view of the coiled washer employed in the nut lock; Fig. 4, a detail perspective view of the housing in which the coiled washer is disposed; and Fig. 5, an end view of the nut employed in the lock, looking at the inner face thereof.

Referring to the drawing, 10 indicates a rail of the usual construction and 11 and 12 fish plates of the type employed in the construction of an ordinary rail joint. The web of the rail 10 and the fish plates 11 and 12 are provided with alining apertures, through which the shank of a bolt 13 projects. This bolt is of the usual construction and is provided with the threaded end 14. Encircling the bolt 13 is a resilient helicoidally coiled washer 15, one end of which is bent so as to be disposed longitudinally of the bolt 13, as at 16, while the other end is extended tangentially to the coil of the washer for engagement with the tread of the rail 10.

Surrounding the major portion of the coiled washer 15 and pierced at one end by the bolt 13 is a housing 17, the inner end of which housing is closed by the outer face of the fish plate 12. The wall of the opening in the outer end of the housing 17 through which the bolt projects is provided with a recess 18, and through this recess the portion 16 of the coiled washer 15 projects. The cylindrical wall of the housing 17 is provided with a recess 19 through which the tangentially disposed portion of the washer extends in order that the latter may engage the tread of the rail, and thus prevent the rotation of the washer and housing during the locking of the device.

Mounted on the threaded end of the bolt 13 is a nut 20, the inner face of which is provided with a plurality of recesses 21 adapted to successively traverse the outer end of the portion 16 of the coiled washer as said nut is screwed upon the bolt 13.

The operation of the nut lock is as follows:—Assuming the bolt 13 has been passed through the openings in the fish plates 11 and 12 and the rail 10, the coiled washer is placed upon the shank of the bolt so as to lie adjacent the fish plate 12 with the outer end of its tangentially disposed portion in engagement with the tread of the rail. The housing 17 is then placed upon the shank of the bolt so that the outer end of the portion 16 of the washer will project through the recess 18 and the tangentially disposed portion of said washer through the recess 19. When the washer and housing are in this relation, the nut 20 is screwed upon the bolt until the inner face thereof bears against the outer end of the housing 17 and forces the latter firmly into engagement with the fish plate 12. During this movement of the nut, the latter will engage the outer end of the portion 16 of the washer and gradually force the same inwardly against the influence of its own resiliency. However, as soon as one of the recesses 21 in the inner face of the nut alines with the portion 16 of the washer, the latter will be sprung outwardly into said recess and thus lock the nut against accidental rotation.

It will of course be understood that the number of recesses in the inner face of the nut may be varied as circumstances may require, and that certain changes in the size, proportion and arrangement of the parts may be resorted to without departing from the scope of the invention.

What is claimed is:—

In a nut lock, the combination with an apertured member provided with a lateral extension, of a bolt inserted through the aperture thereof, a nut on said bolt having a plurality of recesses in its inner face, a housing between the nut and the member through which the bolt extends, said housing being formed of a cylindrical tubular member having an inwardly directed flange on the end thereof adjacent the nut provided with a radial recess in its free edge, and further having a recess in the edge of its cylindrical side wall which is adjacent the apertured member, and a helicoidally coiled resilient washer surrounding the bolt and disposed within the housing, said washer having its forward end directed longitudinally of the bolt and projecting through the recess in the flange and engaging successively in the recesses in the inner face of the nut during the locking rotation of the latter, and further having its other end extended tangentially to the convolutions of the coil through the recess in the side wall of the housing and engaging the lateral extension of the apertured member under tension whereby said washer and housing are held against rotation under the influence of the final locking rotation of the nut.

In testimony whereof, we affix our signatures in the presence of two witnesses.

ROBT. ESPY EBBS.
JAMES ALEXANDER McCULLER.

Witnesses:
J. T. ARCHER,
J. R. BABER.

---

Copies of this patent may be obtained for five cents each, by addressing the "Commissioner of Patents, Washington, D. C."